US012705470B2

(12) United States Patent
Howell et al.

(10) Patent No.: US 12,705,470 B2
(45) Date of Patent: Aug. 11, 2026

(54) METHOD OF MONITORING A STATE OF A MACHINE LEARNING CLASSIFIER

(71) Applicants: AIRBUS OPERATIONS LIMITED, Bristol (GB); AIRBUS OPÉRATIONS (S.A.S.), Toulouse Cedex (FR)

(72) Inventors: George Howell, Bristol (GB); Laura Capelleras Magana, Toulouse Cedex (FR)

(73) Assignees: AIRBUS OPERATIONS LIMITED, Bristol (GB); AIRBUS OPERATIONS (S.A.S.), Toulouse (FR)

( * ) Notice: Subject to any disclaimer, the term of this patent is extended or adjusted under 35 U.S.C. 154(b) by 909 days.

(21) Appl. No.: 17/990,502

(22) Filed: Nov. 18, 2022

(65) Prior Publication Data

US 2023/0368009 A1 Nov. 16, 2023

(30) Foreign Application Priority Data

Nov. 24, 2021 (GB) ..................................... 2116934

(51) Int. Cl.
*G06N 20/00* (2019.01)
*G06N 3/063* (2023.01)

(52) U.S. Cl.
CPC ............. *G06N 3/063* (2013.01); *G06N 20/00* (2019.01)

(58) Field of Classification Search
None
See application file for complete search history.

(56) References Cited

U.S. PATENT DOCUMENTS 6,114,976 A * 9/2000 Vian ...................... B64D 25/10 340/963
11,360,476 B1 * 6/2022 Greve .................... B64D 43/00
11,410,056 B1 * 8/2022 Xu ......................... G07C 5/085
(Continued)

FOREIGN PATENT DOCUMENTS

WO 2021130061 A1 7/2021

OTHER PUBLICATIONS

Aslansefat Koorosh et al., "SafeML: Safety Monitoring of Machine Learning Classifiers Through Statistical Difference Measures", Computer Vision 2020, 16$^{th}$ European Conference, Glasgow, United Kingdom, Aug. 23-28, 2020, pp. 197-211.
(Continued)

*Primary Examiner* — Xuyang Xia
(74) *Attorney, Agent, or Firm* — Nixon & Vanderhye, PC

(57) ABSTRACT

Techniques for monitoring a state of a machine learning classifier to determine an operational mode of an aircraft system are provided. The techniques include applying to each input node of the machine learning classifier an operational mode status of a respective component an aircraft system and a node priority determined by the order of priority of the respective series component path of the aircraft system. Varying, for an operational mode status combination, an input node state of an input node having a relatively low node priority. Indicating a normal state of the machine learning classifier where output node states do not vary in response to the varying, and indicating an altered state of the machine learning classifier where a hidden layer node state and an output node state vary in response to the varying of the input node state.

20 Claims, 6 Drawing Sheets

(56) References Cited

U.S. PATENT DOCUMENTS

| | | | | |
|---|---|---|---|---|
| 12,434,709 | B1 * | 10/2025 | Goel | G06V 20/56 |
| 2021/0374569 | A1 * | 12/2021 | Jezewski | G06N 20/00 |
| 2022/0051198 | A1 * | 2/2022 | Thakkar | G06Q 10/06315 |
| 2022/0245109 | A1 * | 8/2022 | Hatami-Hanza | G06N 7/01 |

OTHER PUBLICATIONS

Combined Search and Examination Report for Application No. GB 2116934.7, 10 pages, dated Jul. 22, 2022.

* cited by examiner

METHOD OF MONITORING A STATE OF A MACHINE LEARNING CLASSIFIER

CROSS RELATED APPLICATION

This application claims priority to United Kingdom Patent Application GB 2116934.7 filed Nov. 24, 2021, the entire contents of which is hereby incorporated by reference.

TECHNICAL FIELD

The present invention relates to a method of monitoring a state of a machine learning classifier configured to determine an operational mode of an aircraft system.

BACKGROUND

Aircraft systems typically comprise many components, making up primary, secondary and even tertiary sets of components to ensure continuity of performance of the aircraft system if performance of one or more components is impaired. Machine learning classifiers may be utilised to determine which set of components is used based on inputs indicative of states of the components.

SUMMARY

A first aspect of the present invention provides a method of monitoring a state of a machine learning classifier configured to determine an operational mode of an aircraft system, the machine learning classifier having an input layer comprising input nodes, an output layer comprising output nodes, at least one hidden layer between the input layer and the output layer, the hidden layer comprising hidden layer nodes, and the machine learning classifier configured to provide an output for determining the operational mode, the method comprising: providing a model of the aircraft system, wherein the model comprises representations of components of the aircraft system and connections between the components, each component associated with an operational mode status, the connections between components defining a plurality of series component paths within the model, each path having an order of priority of the respective components and a set of operational mode status combinations; applying to each input node of the machine learning classifier an operational mode status of a respective component and a node priority determined by the order of priority of the respective series component path; varying, for an operational mode status combination, an input node state of an input node having a relatively low node priority; indicating a normal state of the machine learning classifier where output node states do not vary in response to the varying of the input node state; and indicating an altered state of the machine learning classifier where a hidden layer node state and an output node state vary in response to the varying of the input node state.

Optionally, the method comprises indicating a normal state of the machine learning classifier where hidden layer node states of hidden layer nodes linked to the input node do not vary in response to the varying of the input node state.

Optionally, the method comprises indicating a normal state of the machine learning classifier where hidden layer node states of hidden layer nodes linked to the input node vary in response to the varying of the input node state, and output node states do not vary in response to the varying of the input node state. Optionally, the method comprises indicating a normal state of the machine learning classifier where hidden layer node states of hidden layer nodes linked to the input node vary in response to the varying of the input node state, and output node states do not vary in response to the varying of the hidden layer node states.

Optionally, each path comprises a respective path priority, and the operational mode determined by the machine learning classifier is based at least in part on the path priorities.

Optionally, the method is performed when the aircraft system is non-operational, for example prior to installation in an aircraft, or when an aircraft comprising the aircraft system is stationary and not in-use.

Optionally the method is performed during operation of the aircraft system, for example when the aircraft system is installed in an aircraft. The method may be performed when the aircraft system is installed in an aircraft, and the aircraft is in flight. The method may be performed remotely from the aircraft system, for example by one or more processors located off-board an aircraft on which the aircraft system is performed.

Optionally, at least one of an input node state, a hidden layer node state, and an output node state, are bounded by maximum and minimum values. Optionally, at least one of the input node state, the hidden layer node state, and the output node state can only take either the maximum value or the minimum value.

Optionally, the machine learning classifier comprises a neural network.

Optionally, variation of output node states and/or hidden layer node states are determined based on at least one of a current output node state, a current hidden layer node state, a weight of a connection between an input layer node and a linked hidden layer node, a weight of a connection between a hidden layer node and a linked subsequent hidden layer node, and a weight of a connection between a hidden layer node and a linked output node.

Optionally, output node states are determined not to vary in response to varying of the input node state where at least one of: a weight of a connection between the input node and a hidden layer node to which the output node is linked is zero; a weight of a connection between the output node and a hidden layer node to which the output node is linked is zero; a value of a hidden layer node state of a hidden layer node to which the output node is linked is at a maximum, and a weight of a connection between the hidden layer node and the input node is positive; a value of an output node state of the output node is at a maximum, and a weight of a connection between the output node and a hidden layer node to which the output node is linked is positive; a value of a hidden layer node state of a hidden layer node to which the output node is linked is at a minimum, and a weight of a connection between the hidden layer node and the input node is negative; and a value of an output node state of the output node is at a minimum, and a weight of a connection between the output node and a hidden layer node to which the output node is linked is negative.

Optionally, output node states are determined not to vary in response to varying of the input node state where, for each connection pathway through the machine learning classifier between an input node and an output node, at least one of: a weight of a connection between the input node and a hidden layer node to which the output node is linked is zero; a weight of a connection between the output node and a hidden layer node to which the output node is linked is zero; a value of a hidden layer node state of a hidden layer node to which the output node is linked is at a maximum, and a weight of a connection between the hidden layer node and the input node is positive; a value of an output node state of the output node is at a maximum, and a weight of a connection between the output node and a hidden layer node to which the output node is linked is positive; a value of a hidden layer node state of a hidden layer node to which the output node is linked is at a minimum, and a weight of a connection between the hidden layer node and the input node is negative; and a value of an output node state of the output node is at a minimum, and a weight of a connection between the output node and a hidden layer node to which the output node is linked is negative.

Optionally, hidden layer node states are determined not to vary in response to varying of the input node state where at least one of: a weight of a connection between the input node and the hidden layer node is zero; a weight of a connection between the input node and a previous hidden layer node to which the hidden layer node is linked is zero; a value of a hidden layer node state of a previous hidden layer node to which the hidden layer node is linked is at a maximum, and a weight of a connection between the previous hidden layer node and the input node is positive; a value of a hidden layer node state of the hidden layer node is at a maximum, and a weight of a connection between the hidden layer node and the input node to which the hidden layer node is linked is positive; a value of a hidden layer node state of a previous hidden layer node to which the hidden layer node is linked is at a minimum, and a weight of a connection between the previous hidden layer node and the hidden layer node is negative; and a value of a hidden layer node state of the hidden layer node is at a minimum, and a weight of a connection between the hidden layer node and the input node to which the hidden layer node is linked is negative.

Optionally, hidden layer node states and/or output layer node states are determined to vary in response to varying of the input node state where at least one of: a value of a hidden layer node state of a hidden layer node is at a maximum, and a weight of a connection between the hidden layer node and the input node is negative; a value of a hidden layer node state of a hidden layer node is at a minimum, and a weight of a connection between the hidden layer node and the input node is positive; a value of an output node state of an output node is at a maximum, and a weight of a connection between the output node and a hidden layer node to which the output node is linked is negative; and a value of an output node state of an output node is at a minimum, and a weight of a connection between the output node and a hidden layer node to which the output node is linked is positive.

Optionally, an input node state of an input node having a relatively high node priority is constant whilst varying the input node state of the input node having the relatively low node priority.

Optionally, varying the input node state of the input node having the relatively low node priority takes place where the input node state of the input node having the relatively high node priority is indicative of an altered operational mode status of the component associated with the input node. Optionally, the method comprises varying, for each operational mode status combination in which the input node state of the input node having the relatively high node priority is indicative of an altered operational mode status of the component associated with the input node, a corresponding input node state of a respective input node having a relatively low node priority within the same operational mode status combination.

Optionally, operational mode status combinations are grouped into sub-sets based on any of respective input node states and respective outputs of the machine learning classifier. For example, operational mode status combinations may be grouped into the same subset where operational mode status combinations result in the same output of the machine learning classifier. Operational mode status combinations may be represented by combinations of input node states. Operational mode status combinations with an input node having the relatively high node priority and an associated input node state indicative of an altered operational mode status of the component associated with the input node, may be grouped into the same subset.

Optionally, the aircraft system comprises an aircraft braking system.

A second aspect of the present invention provides an aircraft system comprising a machine learning classifier configured to determine an operational mode of the aircraft system, and a controller configured to perform the method according to the first aspect of the present invention.

A third aspect of the present invention provides an aircraft comprising the aircraft system according the second aspect of the present invention.

A fourth aspect of the present invention provides a data carrier comprising machine-readable instructions for the operation of one or more processors of an aircraft system comprising a machine learning classifier to perform the method according to the first aspect of the present invention.

BRIEF DESCRIPTION OF THE DRAWINGS

Embodiments of the invention will now be described, by way of example only, with reference to the accompanying drawings, in which.

DETAILED DESCRIPTION

Figure 1:
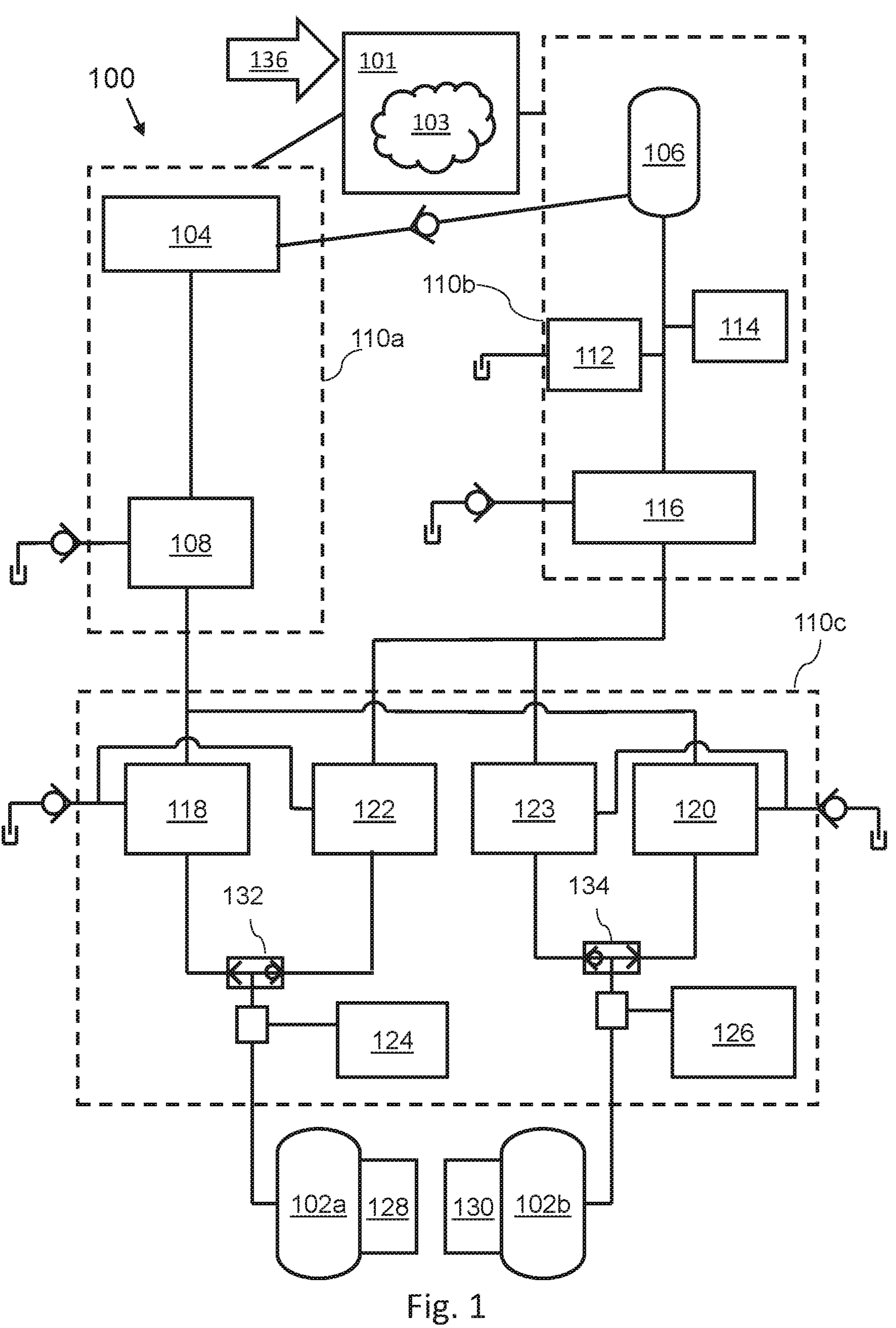
FIG. 1 shows a schematic view of an aircraft system.

An aircraft system 100, in the form of a hydraulic braking system 100, according to the present invention, is illustrated schematically in FIG. 1. The braking system 100 comprises a brake controller 101, with the brake controller 101 including a machine learning classifier 103.

The hydraulic braking system 100 shown in FIG. 1 comprises components which are operated in order to control brakes 102*a*, 102*b*. The brakes 102*a* and 102*b* can be operated either using a first power supply or a second, alternative, power supply. In this example, the first power supply is provided by a hydraulic pump 104, and the second power supply is provided by a hydraulic accumulator 106. In some examples, as in the example of FIG. 1, the hydraulic pump 104 can be used to supply power to the hydraulic accumulator 106, if needed, with a check valve preventing backflow from the accumulator 106 to the hydraulic pump 104. A first selector valve 108 selects operation using the first power supply 104. Collectively, the first power supply 104 and the first selector valve 108 may be thought of as a first set of components 110*a* for providing a braking function of the hydraulic braking system 100. The first set of components 110$a$ may also comprise other components including monitoring equipment (not shown). Operating the first selector valve 108 comprises providing an electrical signal to a coil which actuates the valve. The first selector valve 108 may comprise two such coils for redundancy purposes.

The hydraulic accumulator 106 is a pressurised container. When used to operate the brakes 102$a$ and 102$b$, the pressure which is delivered to the rest of the braking system from the accumulator 106 is monitored and controlled to ensure the safe operation of the brakes 102$a$ and 102$b$. A relief valve 112 controls the pressure of fluid released from the accumulator 106, a pressure transducer 114 monitors the pressure from the hydraulic accumulator 106, and a second selector valve 116 selects the hydraulic accumulator 106 as the power supply for operating the brakes 102$a$ and 102$b$. Collectively the hydraulic accumulator 106, the relief valve 112, the pressure transducer 114, and the second selector valve 116 may be thought of as a second set of components 110$b$ for providing a braking function of the hydraulic braking system 100.

After the operation of either the first selector valve 108 or the second selector valve 116, power, in the form of pressurised fluid, is provided in a brake operation system 110$c$. A first servo valve 118 and a second servo valve 120 are used to control the supply of hydraulic fluid from the hydraulic pump 104 to the first 102$a$ and second 102$b$ brakes respectively. The first 118 and second 120 servo valves may be considered part of the first set of components 110$a$, although this is not illustrated by the dashed box in FIG. 1 for the sake of clarity. A third servo valve 122 and a fourth servo valve 123 are used to control the supply of hydraulic fluid provided by the accumulator 106 to the first 102$a$ and second 102$b$ brakes. The third 122 and fourth 123 servo valves may be considered part of the second set of components 110$b$, although this is not illustrated by the dashed box in FIG. 1 for the sake of clarity. The hydraulic braking system 100 comprises two pressure transducers 124 and 126 for monitoring the pressure of hydraulic fluid being provided to each of the brakes 102$a$ and 102$b$.

Shuttle valves 132, 134 are included between the first 118, second 120, third 122 and fourth 123 servo valves and the brakes 102$a$, 102$b$ to ensure that the highest-pressure input is fed through to the brakes. The use of shuttle valves prevents the pressurised fluid from the accumulator 106 from being fed back into the primary power supply, and vice versa. In other words, these shuttle valves ensure that fluid delivered from the accumulator goes to the brakes and not backwards through the first 118 and second 120 servo valves.

Two tachometers 128 and 130 are used to monitor the speed of the wheels during braking to provide feedback in the braking control system. It will be appreciated that other components not shown may also be included and used in the hydraulic braking system 100, such as further sensors, actuators, and the like. It is also to be understood that while specific examples of equipment have been described herein, other equipment may also be used. For example, a wheel speed sensor other than a tachometer may be used to monitor the speed of the wheels during braking. Similarly, other pressure sensors rather than pressure transducers may be used to monitor the pressure in the hydraulic braking system 100.

Either the first set of components 110$a$ or the second set of components 110$b$ can be utilised to provide a braking function of the hydraulic braking system 100, for example with the first set of components 110$a$ used under normal operating conditions, and the second set of components 110$b$ only being used in the event that the first set of components 110$a$ is considered non-operational, where one or more of the components of the first set of components 110$a$ is considered non-operational.

A decision as to which of the first set of components 110$a$ and the second set of components 110$b$ is utilised can be made by the machine learning classifier 103 based on input data 136. In particular, the controller 101 can receive input data 136 including operational mode statuses, i.e operational or non-operational, for remaining components of the aircraft system 100, and can determine which of the first 110$a$ and second 110$b$ sets of components is utilised based on the input data 136. As will be appreciated, the machine learning classifier 103 is trained offline prior to installation in the aircraft system 100, utilising appropriate training and testing/validation data. Given the functionality of the machine learning classifier 103 in determining an operational mode of the aircraft system 100, verification that the machine learning classifier 103 operates in the intended manner may be deemed important.

Figure 2:
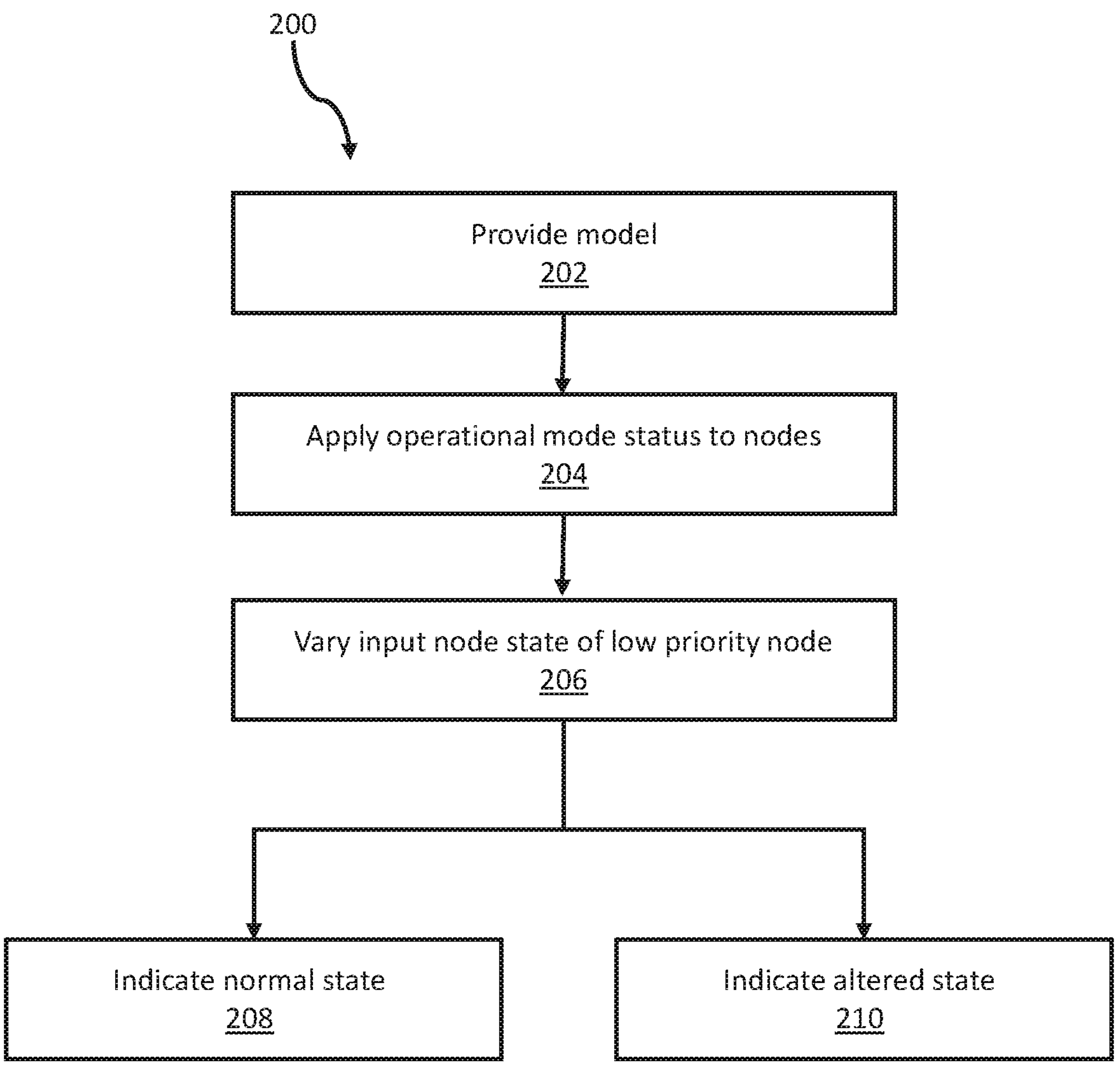
FIG. 2 shows a flow diagram illustrating a method of monitoring a state of a machine learning classifier configured to determine an operational mode of the aircraft system of FIG. 1.
Figure 3:
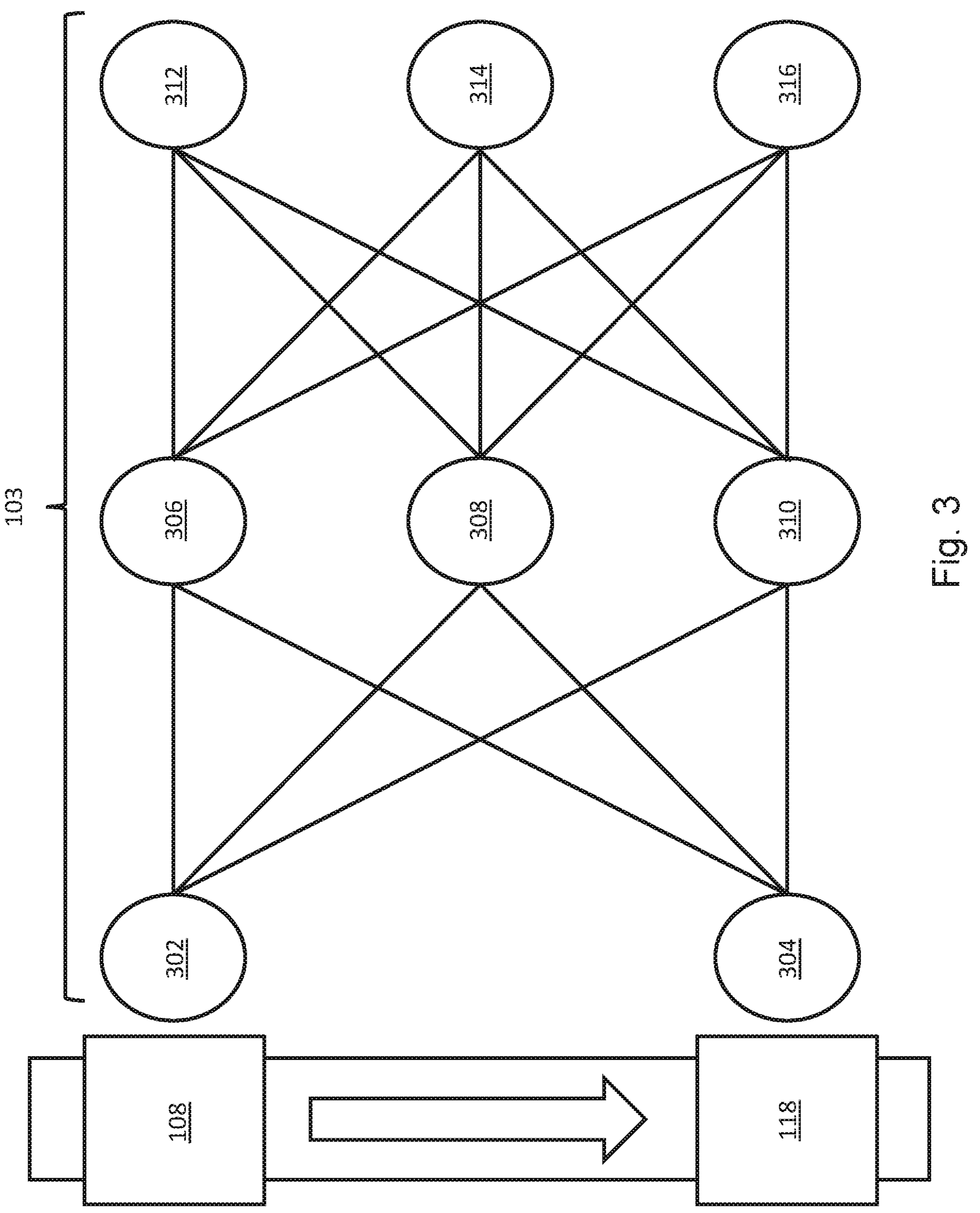
FIG. 3 shows a first schematic illustration of a machine learning classifier in accordance with the method of FIG. 2.

To this end, a method 200 of monitoring a state of the machine learning classifier 103 is provided, as illustrated in the flow diagram of FIG. 2, with the machine learning classifier 103 illustrated schematically in FIG. 3. Here the machine learning classifier 103 has first and second input nodes 302,304, first through third hidden layer nodes 306, 308,310, and first through third output nodes 312,314,316. The input nodes 302,304 have respective input node states, the hidden layer nodes 306,308,310 have respective hidden layer node states, and the output nodes 312,314,316 have respective output node states. The machine learning classifier 103 can be, for example, a neural network or a decision tree. Although illustrated here with a specific number of nodes, it will be appreciated that the number of nodes, and the number of hidden layers, can vary in practice.

The method 200 comprises providing 202 a model of the aircraft system 100, where the model comprises representations of components of the aircraft system 100 and connections between the components. The model may, in some examples, be pictorially represented as in the schematic diagram of FIG. 1. As indicated above, it will be appreciated that each component of the aircraft system 100 has an associated operational mode status, i.e. operational or partially operational/non-operational. It can further be seen from FIG. 1 that certain components within the aircraft system 100 define a series path within the model. For example, the first power supply 104, the first selector valve 108, and the first servo valve 118 define one series path, and the accumulator 106, relief valve 112, second selector valve 116 and third servo valve 122 define another series path. As will be discussed in more detail hereafter, each component within a path can be assigned a priority, for example a priority that decreases down the path ordering, and each path has a set of operational mode status combinations given the different combinations of operational mode status for each component.

The method 200 comprises applying 204 to each input node 302,304 an operational mode status of a respective component of the aircraft system 100, and a node priority that is determined by the order of priority of the respective series component path.

The method 200 comprises varying 206, for an operational mode status combination, an input node state of an input node 302,304 having a relatively low node priority.

The method 200 comprises indicating 206 a normal state of the machine learning classifier 103 where output node states do not vary in response to the varying of the input node state.

The method 200 comprises indicating 208 an altered state of the machine learning classifier 103 where a hidden layer node state and an output node state vary in response to the varying of the input node state.

The method 200 will now be described in more detail with reference to FIGS. 3-5. As noted above, the illustrated machine learning classifier 103 has two input nodes 302, 304, and so the method will be described with reference to a series component path of two components. It will be appreciated however that the method 200 may be extended to series component paths of other, greater, lengths. As just one example, a series component path in accordance with the method comprises the first selector valve 108 and the first servo valve 118. Here the first selector valve 108, as an upstream component, is assigned a relatively high priority in the series component path, and the first servo valve 118, as a downstream component, is assigned a relatively low priority in the series component path.

The machine learning classifier 103 in the described example comprises a neural network where values of the input node states, hidden layer node states, and output node states are bounded between a minimum value of 0, and a maximum value of 1, with the input node states, hidden layer node states, and output node states able to take either the minimum value of 0 or the maximum value of 1. The machine learning classifier 103 implements a sigmoid function to achieve the bounded values. A value of 1 can be considered as a node being activated, whilst a value of 0 can be considered as a node being deactivated.

The first input node 302 is mapped to the first selector valve 108, and the second input mode 304 is mapped to the first servo valve 118. As there are only two components, the first selector valve 108 and the first servo valve 118, in the considered series component path, and each of the associated first 302 and second 304 input nodes can only take a value of 0 or 1, thereby representing a normal operational mode status or an altered operational mode status (e.g. partially operational or non-operational) respectively, the series component path has a set of operational mode status combinations as shown in Table 1 below.

TABLE 1

| First Input Node State | Second Input Node State | Sub-Set |
|---|---|---|
| 0 | 0 | 1 |
| 0 | 1 | 2 |
| 1 | 0 | 3 |
| 1 | 1 | 3 |

From Table 1, it can be seen that each operational mode status combination of the set of operational mode status combinations can be grouped into a sub-set, where each sub-set has a respective output for the machine learning classifier 103. In particular, where the state of the first input node 302 (which has a relatively high priority) is indicative of the upstream component, i.e. the first selector valve 108, having an altered operational mode status, for example with the first selector valve 108 being non-operational, it will be appreciated that the state of the second input node 304 should not have an impact on the output of the machine learning classifier 103. Operational mode status combinations in which the state of the first input node 302 is indicative of an altered operational mode of the upstream component, i.e. the first selector valve 108, can therefore be grouped in the same sub-set, in this case sub-set 3.

To verify operation of the machine learning classifier 103, the controller 101 can then vary the state of the second input node 304, and monitor the machine learning classifier 103 to determine the impact of such varying on the output of the machine learning classifier. In particular, it will be appreciated that a normal state of the machine learning classifier 103 is determined where such varying of the state of the second input node 304 does not lead to variation of a state of the first through third hidden layer nodes 306,308,310, or a variation of a state of the first through third output nodes 312,314,316. Similarly, an altered state of the machine learning classifier 103 is determined where such varying of the state of the second input node 304 leads to variation of a state of the first through third hidden layer nodes 306,308,310, and a variation of a state of the first through third output nodes 312,314,316.

Whether or not variation of the state of the second input node 304 leads to variation of a state of any of the first through third hidden layer nodes 306,308,310, or variation of a state of any of the first through third output nodes 312,314,316, is determined using the weights of connections between respective nodes of the machine learning classifier 103, as will be described below.

Where the weight of respective connections between the second input node 304 and the first through third hidden layer nodes 306,308,310 is zero, variation of the state of the second input node 304 cannot lead to variation of the states of the first through third hidden layer nodes 306,308,310, and hence cannot lead to variation of the states of the first through third output nodes 312,314,316. In such a circumstance, a normal state of the machine learning classifier 103 is determined, for the reasons discussed above.

If a state of any of the first through third hidden layer nodes 306,308,310 is at a maximum value of 1, and the weight of a respective connection to the second input node 304 is positive, then variation of the state of the second input node 304 cannot lead to variation of the states of the first through third hidden layer nodes 306,308,310, and hence cannot lead to variation of the states of the first through third output nodes 312,314,316. In such a circumstance, a normal state of the machine learning classifier 103 is determined, for the reasons discussed above.

Similarly, if a state of any of the first through third output nodes 312,314,316 is at a maximum value of 1, and the weight of a respective connection to the respective first through third hidden layer nodes 306,308,310 is positive, then variation of the state of the second input node 304 cannot lead to variation of the state of the first through third output nodes 312,314,316, even if the state of the first through third hidden layer nodes 306,308,310 varies in response to variation of the state of the second input node 304. In such a circumstance, a normal state of the machine learning classifier 103 is determined, for the reasons discussed above.

If a state of any of the first through third hidden layer nodes 306,308,310 is at a minimum value of 0, and the weight of a respective connection to the second input node 304 is negative, then variation of the state of the second input node 304 cannot lead to variation of the states of the first through third hidden layer nodes 306,308,310, and hence cannot lead to variation of the states of the first through third output nodes 312,314,316. In such a circumstance, a normal state of the machine learning classifier 103 is determined, for the reasons discussed above. In such a circumstance, a normal state of the machine learning classifier 103 is determined, for the reasons discussed above.

Similarly, if a state of any of the first through third output nodes 312,314,316 is at a minimum value of 0, and the weight of a respective connection to the respective first through third hidden layer nodes 306,308,310 is negative, then variation of the state of the second input node 304 cannot lead to variation of the state of the first through third output nodes 312,314,316, even if the state of the first through third hidden layer nodes 306,308,310 varies in response to variation of the state of the second input node 304. In such a circumstance, a normal state of the machine learning classifier 103 is determined, for the reasons discussed above.

These criteria are illustrated with reference to FIGS. 4 and 5. It will be appreciated that some connections between nodes are not illustrated in FIGS. 4 and 5 for the sake of clarity.

Figure 4:
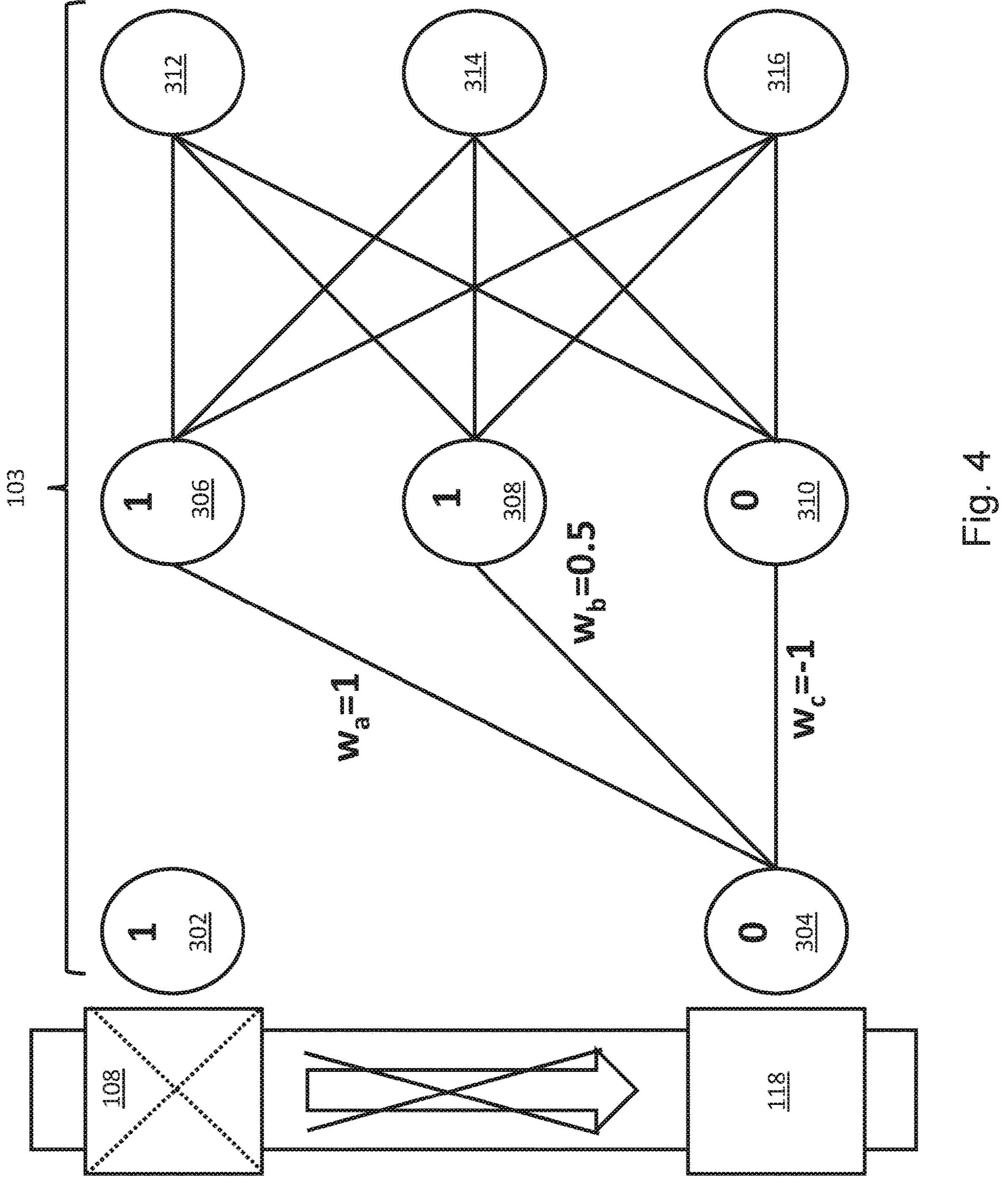
FIG. 4 shows a first schematic illustration of a machine learning classifier in accordance with the method of FIG. 2.

In the example of FIG. 4, for the purpose of illustration only, the first hidden layer node 306 has been assigned a hidden layer node state of the maximum value of 1, and a weight $w_a$ of the connection between the second input node 304 and the first hidden layer node 306 is a positive value of 1. A change in state of the second input node 304 from 0 to 1 therefore does not result in a change in state of the first hidden layer node 306.

The second hidden layer node 308 has a hidden layer node state of the maximum value of 1, and a weight $w_b$ of the connection between the second input node 304 and the second hidden layer node 308 has a positive value of 0.5. A change in state of the second input node 304 from 0 to 1 therefore does not result in a change in state of the second hidden layer node 308.

The third hidden layer node 310 has a hidden layer node state of the minimum value of 0, and a weight $w_c$ of the connection between the second input node 304 and the third hidden layer node 310 has a negative value of −1. A change in state of the second input node 304 from 0 to 1 therefore does not result in a change in state of the third hidden layer node 310.

Thus in the example of FIG. 4, variation of the state of the second input node 304 cannot lead to variation of the states of the first through third hidden layer nodes 306,308,310, and hence cannot lead to variation of the states of the first through third output nodes 312,314,316. In such a circumstance, a normal state of the machine learning classifier 103 is determined, for the reasons discussed above.

Figure 5:
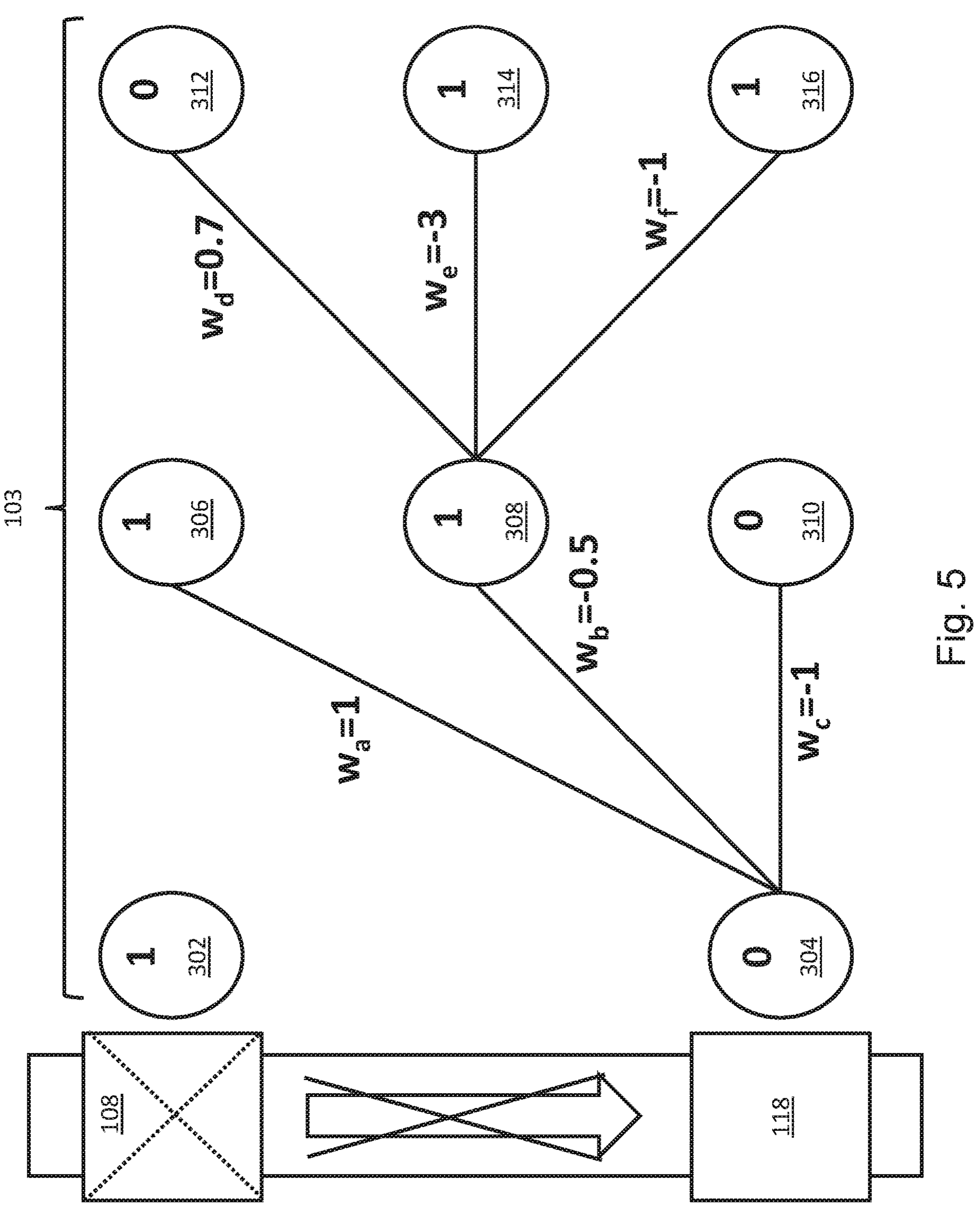
FIG. 5 shows a first schematic illustration of a machine learning classifier in accordance with the method of FIG. 2.

In the example of FIG. 5, for the purpose of illustration only, the first hidden layer node 306 has been assigned a hidden layer node state of the maximum value of 1, and a weight $w_a$ of the connection between the second input node 304 and the first hidden layer node 306 is a positive value of 1. A change in state of the second input node 304 from 0 to 1 therefore does not result in a change in state of the first hidden layer node 306.

The third hidden layer node 310 has a hidden layer node state of the minimum value of 0, and a weight $w_c$ of the connection between the second input node 304 and the third hidden layer node 310 has a negative value of −1. A change in state of the second input node 304 from 0 to 1 therefore does not result in a change in state of the third hidden layer node 310.

However, the second hidden layer node 308 has a hidden layer node state of the maximum value of 1, and a weight $w_b$ of the connection between the second input node 304 and the second hidden layer node 308 has a negative value of −0.5. Thus the state of the second hidden layer node 308 varies when the state of the second input node 304 varies.

The first output node 312 has an output node state of the minimum value of 0, and a weight $w_d$ of the connection between the second hidden layer node 308 and the first output node 312 has a positive value of 0.7. A change in state of the second hidden layer node 308 from the maximum value of 1 to the minimum value of 0 therefore does not result in a change of state of the first output node 312.

The second output node 314 has an output node state of the maximum value of 1, and a weight $w_e$ of the connection between the second hidden layer node 308 and the second output node 314 has a negative value of −3. A change in state of the second hidden layer node 308 from the maximum value of 1 to the minimum value of 0 therefore does not result in a change of state of the second output node 314.

The third output node 316 has an output node state of the maximum value of 1, and a weight $w_f$ of the connection between the second hidden layer node 308 and the third output node 316 has a negative value of −1. A change in state of the second hidden layer node 308 from the maximum value of 1 to the minimum value of 0 therefore does not result in a change of state of the third output node 316.

Thus in the example of FIG. 5, variation of the state of the second input node 304 cannot lead to variation of the states of the first through third output nodes 312,314,316, even though variation of the state of the second input node 304 leads to a variation of the state of the second hidden layer node 308. In such a circumstance, a normal state of the machine learning classifier 103 is determined, for the reasons discussed above.

In each of the examples of FIGS. 4 and 5, variation of the state of the second input node 304 whilst the state of the first input node 302, indicating an altered operational state of the relatively high priority, upstream, component, remains constant, enables verification of the state of the machine learning classifier 103. Verifying that the machine learning classifier 103 is operating in a normal state may enable use of the machine learning classifier 103 in the aircraft control system 100. By varying the state of the second input node 304 for those operational mode status combinations where the state of the first input node 302 indicates an altered operational state of the relatively high priority, upstream, component, verification of the state of the machine learning classifier 103 can take place without having to vary the state of each input node, which may reduce the number of tests required for verification.

Figure 6:
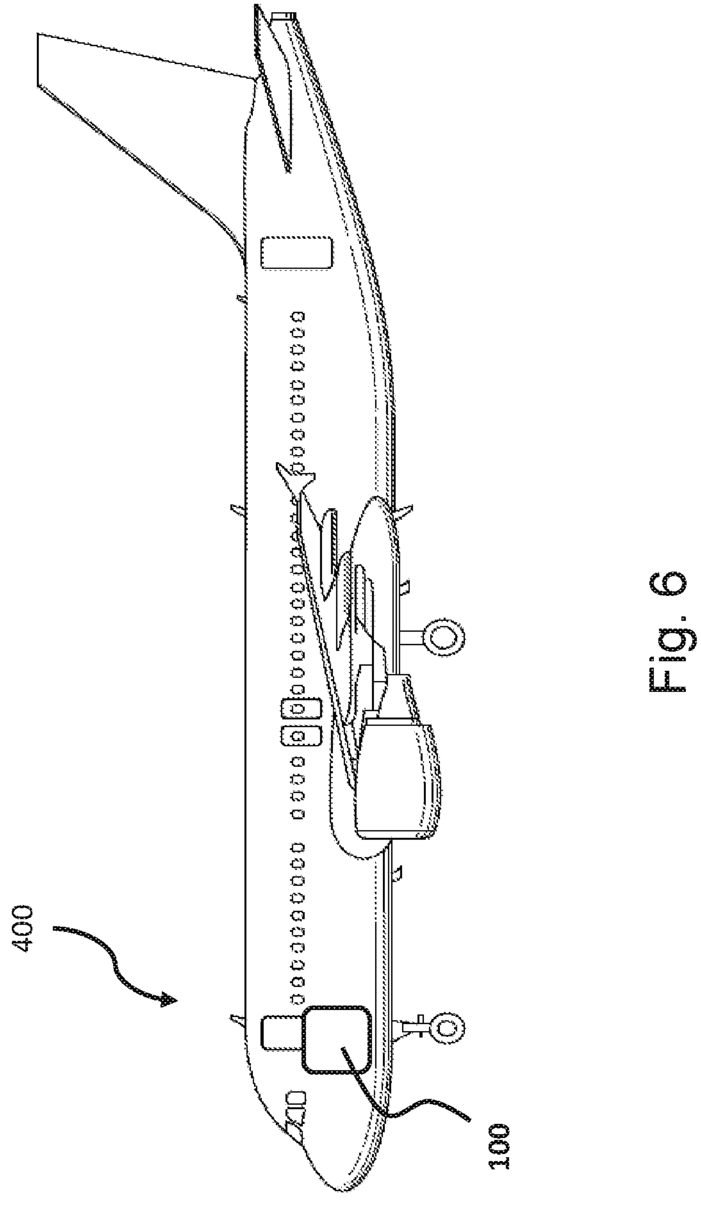
FIG. 6 shows a schematic illustration of an aircraft

An aircraft 400 comprising the aircraft system 100 is illustrated schematically in FIG. 6.

In some examples the method 200 described above is performed when the aircraft system 100 is non-operational. Such a non-operational condition may occur when an aircraft 400 comprising the aircraft system 100 is stationary and not in-use, such that verification of the state of the machine learning classifier can take place before a subsequent flight. Another example of such a non-operational condition may occur prior to installation of the aircraft system 100 in the aircraft 400, or indeed prior to installation of the machine learning classifier 103 in the aircraft system 100.

In some examples the method 200 described above is performed during operation of the aircraft system 100, for example when the aircraft system 100 is operational within the aircraft 400 during flight.

An indication by the method 200 that the machine learning classifier 103 is operating in an altered state enables appropriate action to be taken to restore the machine learning classifier 103 to its normal state. This can occur, for example, via further training of the machine learning classifier 103 and/or adjustment of the weights and nodes, as will be appreciated by a person skilled in the art. Such further training and adjustment may occur offline, i.e. when the machine learning classifier 103 is not utilised in an operating environment such as the aircraft system 100 or the aircraft 400.

Where an altered state of the machine learning classifier 103 is experienced in-flight, action may be taken to perform any of: operating a secondary system, for example a secondary machine learning classifier, rule-based logic, and/or configuration tables, instead of the machine learning classifier 103; informing crew, such as a pilot, of the aircraft 400 of the altered state of the machine learning classifier 103; and transferring a decision regarding which components of the aircraft system 100 to use.

In some examples data from components of the aircraft system 100 may be transmitted from the aircraft 400 to a remote processor, with the remote processor then verifying a state of the machine learning classifier 103 in accordance with the method 200 previously described.

Although described herein in relation to a hydraulic braking system, it will be appreciated that the method 200 may be utilised with other types of aircraft system, particularly those that comprise components in series paths.

The invention claimed is:

1. A method of determining a state of a machine learning classifier configured to determine an operational mode of an aircraft system, the machine learning classifier having an input layer comprising input nodes, an output layer comprising output nodes, at least one hidden layer between the input layer and the output layer, the at least one hidden layer comprising hidden layer nodes, and the machine learning classifier configured to provide an output for determining the operational mode, the method comprising:

providing a model of the aircraft system, wherein the model comprises representations of: a) components configured to operate as part of the aircraft system, and b) connections between the components of the aircraft system, wherein each component in the aircraft system is associated with an operational mode status, and the connections between the components defining a plurality of series component paths within the representations of the aircraft system, each respective series component path of the plurality of series component paths having an order of priority for the respective components in the respective series component path and a set of operational mode status combinations;

applying, to each input node of the machine learning classifier, an operational mode status of a respective component and a node priority of the order of priority of the respective series component path;

varying, for an operational mode status combination, an input node state of at least one of the input nodes that has a relatively low node priority;

generating a normal state indication for the determined state of the machine learning classifier based on determining output node states do not vary in response to a corresponding varying of the input node state; and generating an altered state indication for the determined state of the machine learning classifier based on determining a hidden layer node state and an output node state vary in response to a corresponding varying of the input node state.

2. The method according to claim 1, wherein the method comprises indicating a normal state of the machine learning classifier where hidden layer node states of hidden layer nodes linked to the input node do not vary in response to the varying of the input node state.

3. The method according to claim 1, wherein the method comprises indicating a normal state of the machine learning classifier where hidden layer node states of hidden layer nodes linked to the input node vary in response to the varying of the input node state, and output node states do not vary in response to the varying of the input node state.

4. The method according to claim 1, wherein each path comprises a respective path priority, and the operational mode determined by the machine learning classifier is based at least in part on the path priorities.

5. The method according to claim 1, wherein the method is performed when the aircraft system is non-operational.

6. The method according to claim 1, wherein the method is performed during operation of the aircraft system.

7. The method according to claim 1, wherein at least one of an input node state, a hidden layer node state, and an output node state, are bounded by maximum and minimum values.

8. The method according to claim 1, wherein the machine learning classifier comprises a neural network.

9. The method according to claim 8, wherein variation of output node states and/or hidden layer node states are determined based on at least one of a current output node state, a current hidden layer node state, a weight of a connection between an input layer node and a linked hidden layer node, a weight of a connection between a hidden layer node and a linked subsequent hidden layer node, and a weight of a connection between a hidden layer node and a linked output node.

10. The method according to claim 8, wherein output node states are determined not to vary in response to varying of the input node state where at least one of:

a weight of a connection between the input node and a hidden layer node to which the output node is linked is zero;

a weight of a connection between the output node and a hidden layer node to which the output node is linked is zero;

a value of a hidden layer node state of a hidden layer node to which the output node is linked is at a maximum, and a weight of a connection between the hidden layer node and the input node is positive;

a value of an output node state of the output node is at a maximum, and a weight of a connection between the output node and a hidden layer node to which the output node is linked is positive;

a value of a hidden layer node state of a hidden layer node to which the output node is linked is at a minimum, and a weight of a connection between the hidden layer node and the input node is negative; and a value of an output node state of the output node is at a minimum, and a weight of a connection between the output node and a hidden layer node to which the output node is linked is negative.

11. The method according to claim 8, wherein hidden layer node states and/or output layer node states are determined to vary in response to varying of the input node state where at least one of:

a value of a hidden layer node state of a hidden layer node is at a maximum, and a weight of a connection between the hidden layer node and the input node is negative;

a value of a hidden layer node state of a hidden layer node is at a minimum, and a weight of a connection between the hidden layer node and the input node is positive;

a value of an output node state of an output node is at a maximum, and a weight of a connection between the output node and a hidden layer node to which the output node is linked is negative; and a value of an output node state of an output node is at a minimum, and a weight of a connection between the output node and a hidden layer node to which the output node is linked is positive.

12. The method according to claim 1, wherein an input node state of an input node having a relatively high node priority is constant whilst varying the input node state of the input node having the relatively low node priority.

13. The method according to claim 12, wherein varying the input node state of the input node having the relatively low node priority takes place where the input node state of the input node having the relatively high node priority is indicative of an altered operational mode status of the component associated with the input node.

14. The method according to claim 1, wherein operational mode status combinations are grouped into sub-sets based on any of respective input node states and respective outputs of the machine learning classifier.

15. The method according to claim 1, wherein the aircraft system comprises an aircraft braking system.

16. The method of claim 1, further comprising:

based on generation of the altered state indication for the machine learning classifier, performing at least one of:

a) operating a secondary system instead of the machine learning classifier, wherein the secondary system comprises at least one of a secondary machine learning classifier, rule-based logic, or configuration tables;

b) generating an alert to crew of the aircraft indicating the altered state of the machine learning classifier;

c) transferring a decision regarding which components of the aircraft system to use;

d) performing further training of the machine learning classifier; and/or e) adjusting weights of connections between nodes of the machine learning classifier.

17. The method of claim 1, further comprising:

based on generating the normal state indication for the machine learning classifier, enabling use of the machine learning classifier; and determining, based on the machine learning classifier, the operational mode of the aircraft system.

18. An aircraft system comprising:

a machine learning classifier configured to determine an operational mode of the aircraft system, the machine learning classifier having an input layer comprising input nodes, an output layer comprising output nodes, at least one hidden layer between the input layer, and the output layer, wherein the at least one hidden layer comprising hidden layer nodes, and the machine learning classifier is configured to provide an output for determining the operational mode; and a controller configured to run the machine learning classifier that causes one or more hardware processors to perform operations comprising:

loading data for a model of the aircraft system, wherein the model comprises representations of: a) components configured to operate as part of the aircraft system, and b) connections between the components of the aircraft system, wherein each component in the aircraft system is associated with an operational mode status, and the connections between the components defining a plurality of series component paths within the representations of the aircraft system, each respective series component path of the plurality of series component paths having an order of priority for the respective components in the respective series component path and a set of operational mode status combinations;

applying, to each input node of the machine learning classifier, an operational mode status of a respective component and a node priority of the order of priority of the respective series component path;

varying, for an operational mode status combination, an input node state of at least one of the input nodes having a relatively low node priority; and determining a state of the machine learning classifier based on determining whether a hidden layer node state and/or an output node state vary in response to the varying of the input node state;

wherein the state of the machine learning classifier is determined to be a normal state as a result of determination that output node states do not vary in response to the varying of the input node state, wherein the state of the machine learning classifier is determined to be an altered state as a result of determination that a hidden layer node state and an output node state vary in response to the varying of the input node state.

19. An aircraft comprising the aircraft system according to claim 18.

20. A non-transitory machine readable storage medium storing machine-readable instructions for use with one or more processors of an aircraft system that comprises a machine learning classifier, the machine learning classifier configured to determine an operational mode of an aircraft system, the machine learning classifier having an input layer comprising input nodes, an output layer comprising output nodes, at least one hidden layer between the input layer and the output layer, the at least one hidden layer comprising hidden layer nodes, and the machine learning classifier configured to provide an output for determining the operational mode, the machine-readable instructions comprising instructions that cause the one or more processors to perform operations comprising:

loading a model of the aircraft system, wherein the model comprises representations of: a) components configured to operate as part of the aircraft system, and b) connections between the components of the aircraft system, wherein each component in the aircraft system is associated with an operational mode status, and the connections between the components defining a plurality of series component paths within the representations of the aircraft system, each respective series component path of the plurality of series component paths having an order of priority for the respective components in the respective series component path and a set of operational mode status combinations;

applying, to each input node of the machine learning classifier, an operational mode status of a respective component and a node priority of the order of priority of the respective series component path;

varying, for an operational mode status combination, an input node state of at least one of the input nodes having a relatively low node priority; and determining a state of the machine learning classifier based on determining whether a hidden layer node state and/or an output node state vary in response to the varying of the input node state;

wherein the state of the machine learning classifier is a normal state based on determination that output node states do not vary in response to the varying of the input node state, wherein the state of the machine learning classifier is an altered state based on determination that a hidden layer node state and an output node state vary in response to the varying of the input node state.

* * * * *